United States Patent

[11] 3,602,652

[72] Inventors Vladimir Nikolaevich Dyachkov
ulitsa Stendera, I, kv. I;
Viktor Vasilievich Makarov, ulitsa Avofu. 6, kv. 28; Gennady Ivanovich Karasev, ulitsa Odesskaya, 20, kv. 14, all of Riga, U.S.S.R.

[21] Appl. No. 746,388
[22] Filed July 22, 1968
[45] Patented Aug. 31, 1971
[32] Priority July 27, 1967
[33] U.S.S.R.
[31] 1175580

[54] POWER SUPPLY BRIDGE CIRCUIT FOR TELEPHONE COMMUNICATION SYSTEMS
2 Claims, 3 Drawing Figs.

[52] U.S. Cl. 179/172, 333/24 R
[51] Int. Cl. H04m 19/08
[50] Field of Search 333/179, 172, 173, 24 R

[56] References Cited

UNITED STATES PATENTS

| | | | |
|---|---|---|---|
| 1,732,311 | 10/1929 | Nyquist | 333/24 |
| 1,624,536 | 4/1927 | Christopher | 179/172 |
| 2,709,721 | 5/1955 | Gonitta | 179/173 |

OTHER REFERENCES

Telephony, McMeen & Miller, C 1912, pp. 187- 189.

*Primary Examiner*—Kathleen H. Claffy
*Assistant Examiner*—Jan S. Black
*Attorney*—Waters, Roditi, Schwartz & Nissen

ABSTRACT: A power supply bridge circuit, intended for supplying power to microphones of telephone sets connected to automatic telephone stations consists of four inductance windings wound on one core with the telephone stations forming a bridge and two capacitors connected between opposite ends of the bridge. Such a connection of the windings provides for the compensation of the magnetic flux created by the microphone DC supply and the addition of the alternating magnetic flux of the speaking current which insures a low attenuation of the speaking currents and the power supply to the microphones while maximizing crosstalk attenuation.

POWER SUPPLY BRIDGE CIRCUIT FOR TELEPHONE COMMUNICATION SYSTEMS

The present invention relates to telephone communication systems and, more particularly, it relates to power supply bridge circuits for such systems. The present invention can be employed for power supply of the microphones of subscribers' telephone sets of telephone communication systems.

Known arrangements for power supply of subscribers' sets of telephone systems comprise bridge circuits having either two or four inductance coils with separate magnetic flux cores and capacitors wired, respectively, in the opposite pairs of arms of such bridge circuits.

A disadvantage of such known arrangements results from a great number of inductance coils wound about separate magnetic cores, whereby the value of transition attenuation between the connected lines is greatly influenced by the fringing flux which in this case is the sum of the fluxes of the separate inductance coils. Another disadvantage of known arrangements is comparatively great volume and weight of the cord pairs involved.

It is, therefore, an object of the present invention to provide a power supply bridge circuit for telephone communication systems, which should increase the transition attenuation between the connected lines and at the same time reduce the dimensions of the equipment.

With this and other objects in view a power supply bridge circuit for telephone communication systems is created, having inductance coils and capacitors wired, respectively, into its opposite pairs of arms, in which, according to the invention, the inductance coils are wound about a common magnetic flux core and connected in such a manner that magnetic fluxes created therein by alternating current are added together, whereas magnetic fluxes created by direct current are subtracted from each other.

The present invention will be better understood from a detailed description of several embodiments of the invention, with reference being made to the accompanying drawings, wherein.

Figures 1, 2, 3:
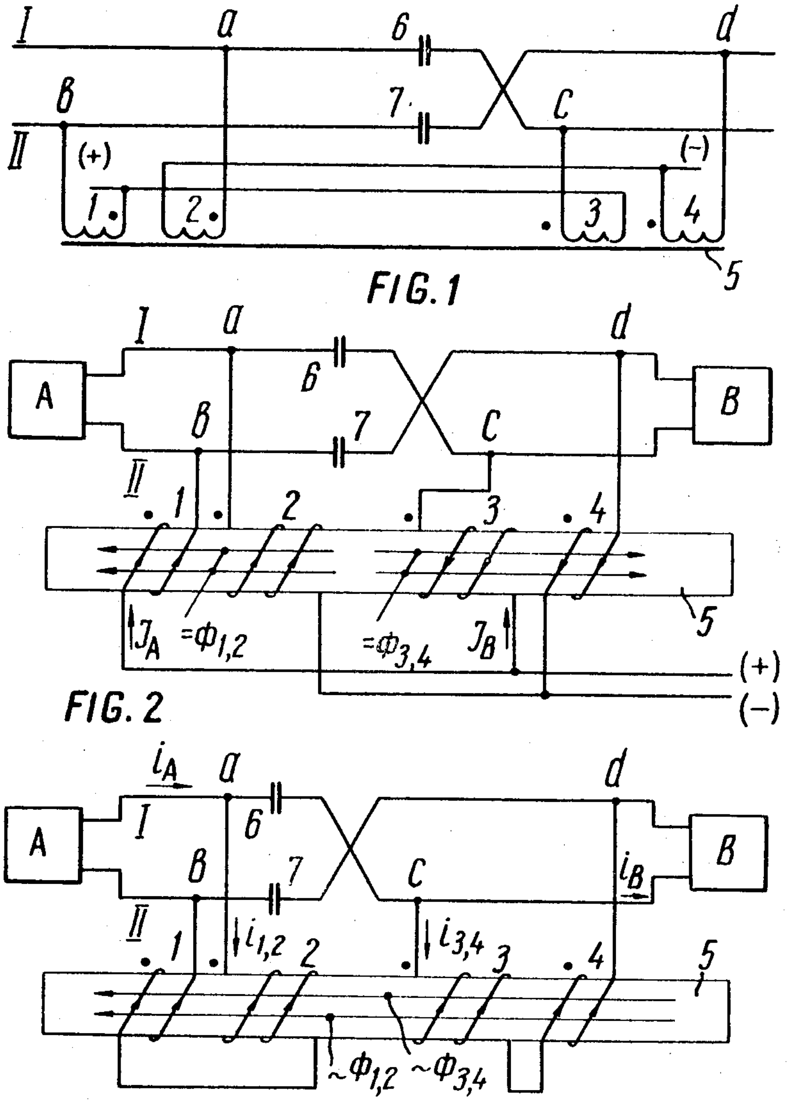
FIG. 1 shows the circuit diagram of a power supply bridge constructed in accordance with the invention.
FIG. 2 shows the equivalent circuit diagram of a power supply bridge for direct current systems, with the magnetic fluxes distributed in accordance with the invention.
FIG. 3 shows the equivalent circuit diagram of a power supply bridge for alternating current systems, with the magnetic fluxes distributed in accordance with the invention.

In the drawings, a power supply bridge circuit for telephone communication systems comprises inductance coils including four windings 1, 2, 3, 4 (FIG. 1) wound about a common magnetic flux core 5, and two segregating capacitors 6 and 7.

The windings 1, 2, 3 and 4 of the inductance coils and the separating capacitors 6 and 7 are wired into the opposite arms "*ac*" and "*cd*" of the bridge circuit. When a subscriber A speaks to a subscriber B the direct current is supplied to the respective microphones (not shown) of the telephone sets A and B in the form of respective flows $I_A$ and $I_B$ along the following paths (FIG. 2):

a. direct current supply of the microphone of the set A: from the positive pole of the DC voltage source to winding 1 of the inductance coil to the microphone of set A, to the winding 2 of the inductance coil, and to the negative pole of the DC voltage source;

b. direct current supply of the microphone of the set B: from the positive pole of the DC voltage source, to winding 3 of the inductance coil, to the microphone of set B, to the winding 4 of the inductance coil, and to the negative pole of the DC voltage source.

As shown in FIG. 2, the windings 1, 2, 3 and 4 of the inductance coils are connected so that current $I_A$ flowing through the windings 1 and 2 in a direction from the beginning of the winding to the end thereof generates a magnetic flux $\Phi_{1,2}$ which is directed opposite to the magnetic flux $_=\Phi_{3,4}$ generated by the current $I_B$ flowing through the windings 3 and 4 in the direction from the end of the winding toward its beginning.

Correspondingly, the resultant direct-current magnetic flux $\Phi$ is equal to the difference between the fluxes generated by the respective currents $I_A$ and $I_B$:

$$\Phi_{1,2} - \Phi_{3,4} = \Phi_=$$

Thus, if the characteristics of the subscribers' lines A and B are similar to each other, and all of the windings, 2, 3 and 4 have the same amount of turns, the resultant magnetic flux $\Phi$ generated by the joint action of the microphone supply currents $I_A$ and $I_B$ equals zero.

$$\epsilon\Phi_= = 0$$

Now, let us consider a case when alternating supply current $i_A$ (FIG. 3) flows from the subscriber's set A to the set B.

In this case the current $i_A$ equals the sum total of three component currents, i.e. of the current $i_{1,2}$ through the windings 1 and 2 of the inductance coil, of the current $i_{3,4}$ through the windings 3 and 4 of the inductance coil and of the current $i_B$ received by the subscriber's set B:

$$i_A = i_{1,2} + i_{3,4} + i_B$$

The current $i_{1,2}$ flows along the following path: from wire I to windings 1 and 2 of the inductance coil, and to wire II. The current $i_{3,4}$ flows along the following path: from wire I to capacitor 6, to windings 3 and 4 of the inductance coil, to capacitor 7, and to wire II.

The windings 1, 2, 3 and 4 of the inductance coil are connected so that the resultant magnetic flux $\Phi_\sim$ of alternating current supply equals the sum of the fluxes generated by the currents $i_{1,2}$ and $i_{3,4}$:

$$\Phi_\sim = {}_\sim\Phi_{1,2} + {}_\sim\Phi_{3,4}$$

The total magnetic flux $\Phi$ is the sum of the magnetic fluxes $\Phi_\sim$ and $\Phi_=$ generated, respectively, by alternating and direct currents:

$$\Phi = \Phi_\sim + \Phi_=$$

Considering that the magnetic flux $\Phi_=$ generated by direct current supply equals zero ($\Phi_= = 0$), the total magnetic flux $\Phi$ is equal to the magnetic flux $\Phi_\sim$ generated by alternating current supply.

It is now clear that the above-described connection of the windings of the inductance coil reduces the influence of the microphone supply current on the magnetic flux through the core and at the same time increases the reactance of the windings 1, 2, 3 and 4 of the inductance coil to alternating current supply, whereby the value of the current $i_B$ received by the subscriber's set B is increased.

Consequently, employment of a power supply bridge with inductance coils having their windings wound about the same magnetic core provides for increasing substantially the transition attenuation between the connected lines and also for reducing considerably the overall dimensions of the equipment involved (which latter fact is of particular value in case of electronic and quasi-electronic telephone exchanges), as well as for cutting the costs of the equipment.

Although the present invention has been described in connection with its preferred embodiments, it should be understood that certain modifications and changes may be introduced without departing from the spirit and scope of the invention, as those competent in the art can easily comprehend.

Such modifications and changes are considered as falling within the scope of the invention, as set forth in the appended claims.

1. A power supply bridge circuit for telephone communication systems for at least two telephone receivers comprising a first pair of inductance coils connected in series and a second pair of inductance coils connected in series, said first and second pair of inductance coils forming first and second branches, a first and a second capacitor forming third and fourth branches and being connected between pairs of opposite ends of said first an second branches, respectively, a common core, said first and second pairs of inductance coils being wound on said common core to subtract magnetic fluxes in said core caused by direct current flowing through said inductance coils and add magnetic fluxes in said core caused by alternating current flowing through said inductance coils, and a direct current circuit connected to each of said coils and adapted for supplying direct current to said coils, said direct current circuit including a positive and a negative pole, said positive pole being connected to one coil in each of said first and second pairs of coils, said negative pole being connected to the other coil in each of said first and second pairs of coils.

2. A power supply bridge circuit as claimed in claim 1, wherein each of said coils of said first and second pair of coils is provided with an equal number of turns to cancel said magnetic fluxes caused by said direct current.